United States Patent [19]
Westgard et al.

[11] Patent Number: 5,937,364
[45] Date of Patent: Aug. 10, 1999

[54] AUTOMATIC SELECTION OF STATISTICAL QUALITY CONTROL PROCEDURES

[75] Inventors: James O. Westgard, Madison, Wis.; Bernard Stein, Ogunquit, Me.

[73] Assignee: WesTgard Quality Corporation, Madison, Wis.

[21] Appl. No.: 08/643,993

[22] Filed: May 7, 1996

[51] Int. Cl.$^6$ .......................... G01N 21/25; G06F 15/18; G06F 17/50; G06F 19/00

[52] U.S. Cl. ................ 702/83; 702/81; 702/82; 702/89; 705/7; 705/21; 364/468.15; 364/468.16; 364/468.17

[58] Field of Search ............................ 705/7, 21; 436/8; 364/151, 468.15, 468.16, 468.17; 702/81, 82, 83, 84

[56] References Cited

PUBLICATIONS

Westgard, et al., Establishing and evaluating QC acceptability criteria; Medical Laboratory Observer, Feb. 1994, v26, n2. p. 1, lines 26–40; p. 2, lines 12–41; p. 3, lines 17–37; p. 4, lines 15–46.

Abbott Datatrac Management System; Operations Manual; 1991; pp. i–vi, 1–1 through 1–6, 4–1 through 4–8, 4–49 through 4–54, 4–65 through 4–76, 6–1, 6–2, 6–41 through 6–50.

Abbott Datatrac Management System, Interface/Troubleshooting Manual, 1991, pp. i–vi, 2–1 through 2–10, 3–1 through 3–18.

Westgard, J.O. and Barry P.L., Cost–Effective Quality Control Managing the Quality and Productivity of Analytical Processes, AACC Press, Washington, D.C., Chap. 3, pp. 65–91 (1986).

Westgard, J.O. and Barry P.L., Cost–Effective Quality Control Managing the Quality and Productivity of Analytical Processes, AACC Press, Washington, D.C., Chap. 4, pp. 92–117 (1986).

Westgard, J.O. and Barry P.L., Cost–Effective Quality Control Managing the Quality and Productivity of Analytical Processes, AACC Press, Washington, D.C., Chap. 7, pp. 160–176 (1986).

Westgard, J.O., Charts of Operational Process Specifications ("OPSpecs Charts") for Assessing the Precision, Accuracy, and Quality Control Needed to Satisfy Proficiency Testing Performance Criteria. *Clin. Chem. 38:* 1226–1233 (1992).

Westgard, J.O., Assuring Analytical Quality Through Process Planning and Quality Control. *Arch. Pathol. Lab. Med. 116:* 765–769 (1992).

(List continued on next page.)

*Primary Examiner*—Allen R. MacDonald
*Assistant Examiner*—Pedro R. Kauof
*Attorney, Agent, or Firm*—Kevin M. Farrell

[57] ABSTRACT

Disclosed is a computer implemented method for automating the selection of an analytical statistical quality control (QC) procedure. Inputs of a quality requirement and observed performance characteristics of a method of measurement are initially provided, together with a database of theoretical operating characteristics of statistical QC procedures. An appropriate quality-planning algorithm (either analytical or clinical) which relates the quality requirement, the observed performance characteristics of the method of measurement, and the theoretical operating characteristics of statistical QC procedures is also provided. Using predetermined QC selection criteria and selection logic, a computer is programmed to automatically choosing, based on the quality requirement, observed method performance, and operating characteristic of candidate QC procedures, a subset of control rules and numbers of control measurements which satisfy selection criteria and selection logic. Also disclosed is a dynamic QC process for automatically changing the statistical QC procedure when there are changes in performance of a method of measurement. In this embodiment, real-time statistical estimates of the performance characteristics of a method are provided through on-line sampling with an analytical instrument and this data is used to automatically select a QC procedure.

23 Claims, 4 Drawing Sheets

OTHER PUBLICATIONS

QC Validator Program Manual, Version 1.1, WesTgard Quality Corporation, Copyright 1995.

Linnet, Choosing quality–control systems to detect maximum clinically allowable analytical errors. *Clin Chem 35:* 284–288 (1989).

Koch et al., Selection of medically useful quality control procedures for individual tests done in a multitest analytical system. *Clin Chem 36:* 230–233 (1990).

Westgard et al., Selection grids for planning Quality Control procedures. *Clin Lab Sci 3:* 271–278 (1990).

Westgard and Wiebe, Cholesterol operational process specifications for assuring the quality required by CLIA proficiency testing. *Clin Chem 37:* 1938–1944 (1991).

Westgard et al., Laboratory process specifications for assuring quality in the U.S. National Cholesterol Education Program. *Clin Chem 37:* 656–661 (1991).

Westgard, J.O., Simulation and modeling for optimizing quality control and improving analytical quality assurance. *Clin Chem 38:* 175–178 (1992).

Westgard, J.O., A QC planning process for selecting and validating statistical QC procedures. *Clin. Biochem. Revs. 15:* 156–164 (1994).

Mugan et al., Planning QC procedures for immunoassays. *J Clin Immunoassay 17:* 216–222 (1994).

AUTOMATIC SELECTION OF STATISTICAL QUALITY CONTROL PROCEDURES

BACKGROUND OF THE INVENTION

Health care providers in the United States have entered a new competitive era. Changes in government reimbursement policies have limited the amount of money that is paid for medical care. Payment of flat fees, based on Diagnostic Related Groups (DRGs), has effectively limited hospital and laboratory charges. Support of Health Maintenance Organizations and similar prepaid medical plans has created new health-care organizations to compete with traditional providers. The new competitive marketplace puts pressure on a provider not only to reduce the costs of products and services but also, and at the same time, to improve their quality, to maintain or increase their share of the market. The effect on clinical laboratories is that performing more tests no longer guarantees more revenue or increased resources to support new tests and services. In addition, the quality of the laboratory's testing services that employ complex analytical processes, and their usefulness to the physician and patient must be at least maintained and, in many cases, improved.

In general, an analytical process includes a measurement procedure and a control procedure. The measurement procedure refers to the analytical method per se, i.e., the reagents, the instrument, and the step-by-step directions for producing an analytical result. The control procedure refers to that part of the process concerned with testing the validity of the analytical result to determine whether it is reliable and can be reported. The development and theoretical aspects of a control procedure are discussed, for example, by Westgard and Barry (Westgard, J. O. and Barry, P. L., *Cost-Effective Quality Control: Manage the quality and productivity of analytical processes*, AACC Press, Washington, DC (1986)).

Improvements in an analytical process translate into reduced costs, higher productivity and improved quality of analysis for an implementing laboratory. In today's competitive environment, laboratories which focus on improvements in such analytical processes are at a competitive advantage relative to those which do not.

SUMMARY OF THE INVENTION

The subject invention relates to a computer implemented method for automating the selection of an analytical statistical quality control (QC) procedure. Inputs of a quality requirement and observed performance characteristics of a method of measurement are initially provided, together with a database of theoretical operating characteristics of statistical QC procedures. An appropriate quality-planning algorithm (either analytical or clinical) which relates the quality requirement, the observed performance characteristics of the method of measurement, and the theoretical operating characteristics of statistical QC procedures is also provided. Using predetermined QC selection criteria and selection logic, a computer is programmed to automatically choosing, based on the quality requirement, observed method performance, and operating characteristic of candidate QC procedures, a subset of control rules and numbers of control measurements which satisfy selection criteria and selection logic.

In another embodiment, the subject invention relates to a dynamic QC process for automatically changing the statistical QC procedure when there are changes in performance of a method of measurement. In this embodiment, real-time statistical estimates of the performance characteristics of a method are provided through on-line sampling with an analytical instrument and this data is used to automatically select a QC procedure.

DESCRIPTION OF PREFERRED EMBODIMENTS

Figure 1:
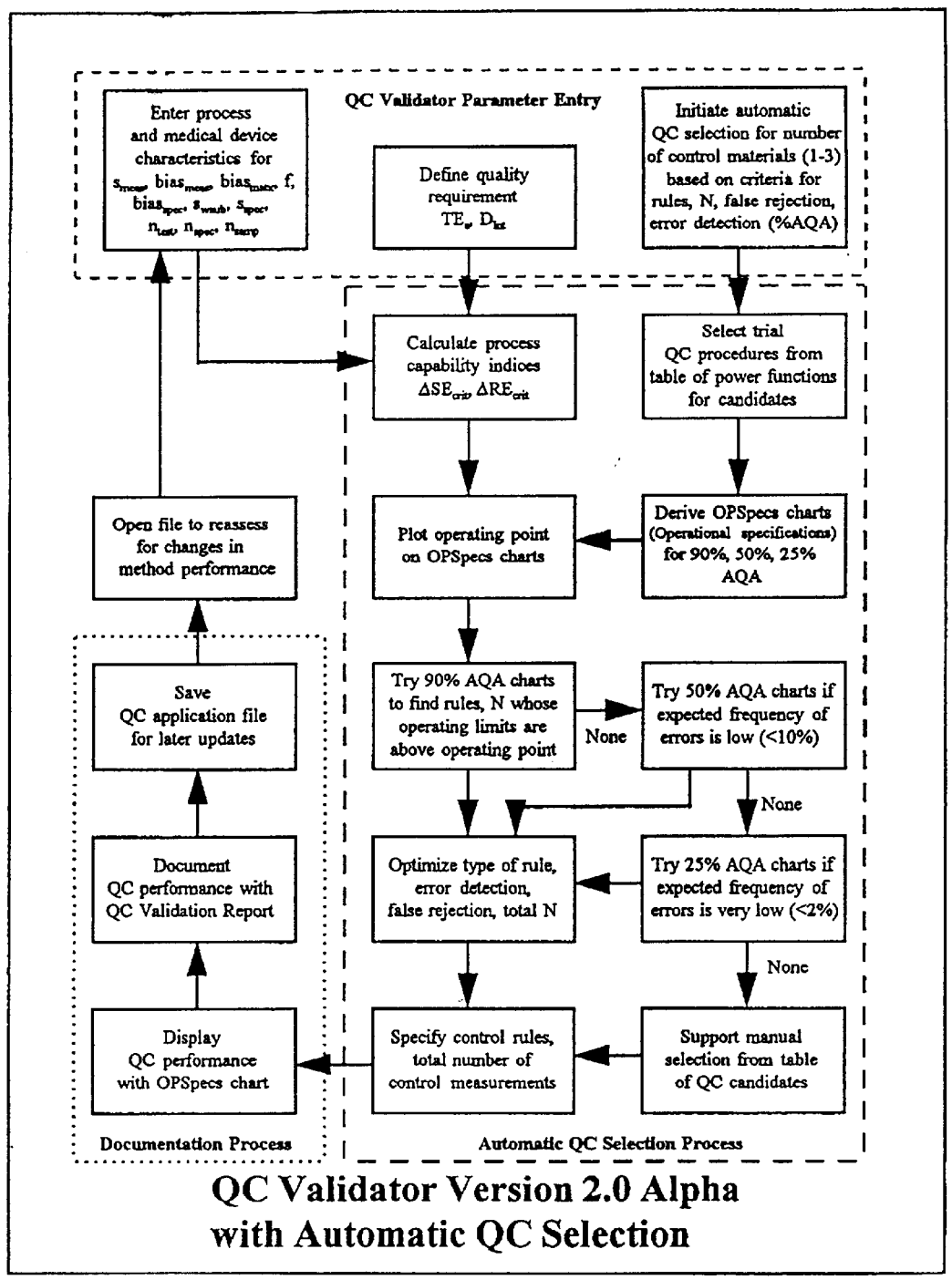
FIG. 1 represents a logic diagram for automatic quality control procedure selection in both clinical and analytical formats.

The present invention relates to a computer implemented method for automating the selection of a statistical quality control procedure. The discussion which follows relates primarily to the application of the invention in the field of clinical diagnosis for human or animal healthcare. However, the invention has applications in other fields of use where comparatively small numbers of controls plotted on a statistical control chart (e.g., the Levey-Jennings chart), are used to determine the acceptability of much larger numbers of samples tested by the same analytical method within the same time period.

The selection of a statistical quality control procedure is an essential element in the development of an analytical process. A statistical quality control procedure is necessary to alert an analyst when medically important errors occur. The control procedure should be selected on the basis of the needed capabilities for error detection, as well as practical considerations related to its rate of false alarms, ease of use, training requirements, etc. The performance of the control procedure should be documented in quantitative terms, so the chance of detecting the medically important errors is known.

A direct way to check the quality of an analytical sample is by comparison to control samples having predetermined characteristics (e.g., concentration of an analyte) which behave similar to patient test samples. Control sample, as used herein, refers to a control material or solution which can be purchased, or produced by dissolving appropriate concentrations of a solute in an appropriate solvent (typically buffered saline). Such materials are widely available as controls for clinical chemistry analytes.

The analytical results obtained for control solutions (analyzed for purposes of quality control) are called control measurements or control observations. Such measurements are made using an analytical instrument. In some control procedures, the individual results are plotted and interpreted directly. Many procedures, however, require calculations to be performed on the control measurements before the data can be used to test control status. These derived or calculated values are called control statistics; for example, the mean of a group of six control measurements could be used as a control statistic.

Statistical techniques can be used to determine whether the control measurements are different from the known values. Such procedures are known as statistical quality-control procedures, or simply, quality-control procedures. Control procedures are commonly implemented by plotting control measurements (or statistics calculated from those measurements) on control charts; a control chart, therefore, is a statistical control model that provides a visual representation to aid interpretation. The American Society for Quality Control (ASQC) states that a control chart is "a graphical method for evaluating whether a process is, or is not, in a 'state of statistical control'".

By using control charts, analysts make decisions about the acceptability of the analytical results from individual analytical runs. Aliquots or samples from one or more stable control solutions are analyzed by the measurement procedure during each analytical run. The results are plotted on a control chart and compared with the control limits drawn on the chart; thus the analyst determines whether an analytical run is in control or out-of-control and whether the results for the patients' samples in that run are to be reported.

According to the ASQC, control limits are the "limits on a control chart which are used as criteria for signaling the need for action, or for judging whether a set of data does, or does not, indicate a 'state of control'". Control limits consist of upper and lower limits, which define a range of acceptable values. In general, an analytical run is judged to be in control when the control measurements fall within the control limits, and out of control when the control limits are exceeded.

An analytical run can be defined as a period of time or series of measurements, within which the accuracy and precision of the measuring system is expected to be stable; between analytical runs, events may occur causing the measurement process to be susceptible to variations which are important to detect (see also NCCLS Document C24-A, *Internal Quality Control Testing: Principles and Definitions*, Vol 11 (No. 6), National Committee for Clinical Laboratory Standards, 940 West Valley Road, Suite 1400, Wayne, PA. 19087-1898). The length of an analytical run must be defined appropriately for the specific analytical system and specific laboratory application. The manufacturer should recommend run length for the analytical system and the user should define run length for the specific application. Thus, the length of an analytical run depends on the stability of the measurement procedure and its susceptibility to errors.

However defined, an analytical run will include a certain number of patients' and control samples. An analytical run is that group of samples for which a decision is to be made concerning the validity of the measurements. The number of control measurements per run, N, is the actual number of control measurements available when judging the control status of the measurement procedure. N is critical for determining the performance characteristics of a control procedure.

i. Analytical Quality Control

QC requirements can be defined in either clinical or analytical formats (or terms) and the methods and compositions of the present invention relate to both categories. The logic for both the analytical and clinical embodiments are shown in FIG. 1. Referring first to the analytical embodiment, inputs of a quality requirement are essential. Analytical quality requirements have been defined by the CLIA-88 proficiency testing (PT) criteria for acceptable performance (Federal Register 57(40): 7002 (Feb. 28, 1992)). These criteria are presented in three different ways:

as absolute concentration limits, e.g., target value±1 mg/dL for calcium;

as a percentage, e.g., target value±10% for albumin, cholesterol, and total protein; and as the distribution of a survey group, e.g., target value±3 standard deviations (SD) for thyroid stimulating hormone.

In a few cases, two sets of limits are given, e.g., the glucose requirement is given as the target value±6 mg/dL or ±10% (whichever is greater).

The CLIA PT criteria specify the total errors that are allowable. The total error format is implicit because the CLIA-88 rules specify that only a single test is to be performed for each PT specimen. Under such conditions, the observed analytical error will be the total error due to both inaccuracy and imprecision. Following is a list of the CLIA proficiency testing criteria for the currently regulated analytes, based on the Feb. 28, 1992, Federal Register.

| Test or Analyte | Acceptable Performance |
|---|---|
| Routine Chemistry | |
| Alanine aminotransferase (ALT) | Target value ± 20% |
| Albumin | Target value ± 10% |
| Alkaline phosphatase | Target value ± 30% |
| Amylase | Target value ± 30% |
| Aspartate aminotransferase (AST) | Target value ± 20% |
| Bilirubin, total | Target value ± 0.4 mg/dL or ± 20% (greater) |
| Blood gas $pO_2$ | Target value ± 3 SD |
| Blood gas $pCO_2$ | Target value ± 5 mm Hg or ± 8% (greater) |
| Blood gas pH | Target value ± 0.04 |
| Calcium, total | Target value ± 1.0 mg/dL |
| Chloride | Target value ± 5% |
| Cholesterol, total | Target value ± 10% |
| Cholesterol (HDL) | Target value ± 30% |
| Creatine kinase | Target value ± 30% |
| Creatine kinase isoenzymes | MB elevated (present or absent) or Target value ± 3 SD |
| Creatinine | Target value ± 0.3 mg/dL or ± 15% (greater) |
| Glucose | Target value ± 6 mg/dL or ± 10% (greater) |
| Iron, Total | Target value ± 20% |
| Lactate dehydrogenase (LDH) | Target value ± 20% |
| LDH isoenzymes | LDH1/LDH2 (+ or −) or Target value ± 30% |
| Magnesium | Target value ± 25% |
| Potassium | Target value ± 0.5 mmol/L |
| Sodium | Target value ± 4 mmol/L |
| Total protein | Tarqet value ± 10% |
| Triglycerides | Target value ± 25% |
| Urea Nitrogen | Target value ± 2 mg/dL or ± 9% (greater) |
| Uric acid | Target value ± 17% |
| Toxicology | |
| Alcohol, blood | Target value ± 25% |
| Blood lead | Target value ± 10% or ± 4 mcg/dL (greater) |
| Carbamazepine | Target value ± 25 |
| Digoxin | Target value ± 20% or 0.2 ng/mL (greater) |
| Ethosuximide | Target value ± 20% |
| Gentamicin | Target value ± 25% |
| Lithium | Target value ± 0.3 mmol/L or ± 20% (greater) |
| Phenobarbital | Target value ± 20% |
| Phenytoin | Target value ± 25% |
| Primidone | Target value ± 25% |
| Procainamide (and metabolite) | Target value ± 25% |
| Quinidine | Target value ± 25% |
| Theophylline | Target value ± 25% |
| Tobramycin | Target value ± 25% |
| Valproic acid | Target value ± 25% |
| Hematology | |
| Cell identification | 90% or greater consensus on identification |
| White cell differentiation | Target ± 3 SD based on percentage of different types of white cells |
| Erythrocyte count | Target ± 6% |
| Hematocrit | Target ± 6% |

-continued

| Test or Analyte | Acceptable Performance |
|---|---|
| Hemoglobin | Target ± 7% |
| Leukocyte count | Target ± 15% |
| Platelet count | Target ± 25% |
| Fibrinogen | Target ± 20% |
| Partial thromboplastin time | Target ± 15% |
| Prothrombin time | Target ± 15% |
| Endocrinology | |
| Cortisol | Target value ± 25% |
| Free thyroxine | Target value ± 3 SD |
| Human chorionic gonadotropin | Target value ± 3 SD or (positive or negative) |
| $T_3$ uptake | Target value ± 3 SD by method |
| Triiodothyronine | Target value ± 3 SD |
| Thyroid stimulating hormone | Target value ± 3 SD |
| Thyroxine | Target value ± 20% or 1.0 mcg/dL (greater) |
| General Immunology | |
| Alpha-1 antitrypsin | Target value ± 3 SD |
| Alpha-fetoprotein | Target value ± 3 SD |
| Antinuclear antibody | Target value ± 2 dilution or (positive or negative) |
| Antistreptolysin O | Target value ± 2 dilution or (positive or negative) |
| Anti-Human Immunodeficiency virus | Reaction or nonreactive |
| Complement C3 | Target value ± 3 SD |
| Complement C4 | Target value ± 3 SD |
| Hepatitis (HBsAg, anti-HBc, HBeAg) | Reactive (positive) or nonreactive (negative) |
| IgA | Target value ± 3 SD |
| IgE | Target value ± 3 SD |
| IgG | Target value ± 25% |
| IgM | Target value ± 3 SD |
| Infectious mononucleosis | Target value ± 2 dilution or (positive or negative) |
| Rheumatoid factor | Target value ± 2 dilution or (positive or negative) |
| Rubella | Target value ± 2 dilution or (positive or negative) |

In addition to the input of a quality requirement (as, for example, defined by the current CLIA standards), inputs of observed performance characteristics of a method of measurement are also provided in connection with the analytical embodiment of the present invention. In preferred embodiments, these observed performance characteristics include the following: stable imprecision observed ($S_{meas}$); stable inaccuracy ($bias_{meas}$); matrix inaccuracy ($bias_{matx}$); number of replicate samples ($n_{samp}$); z-value for maximum defect rate (z); and expected instability (frequency of errors, f). These terms are defined as follows:

$bias_{meas}$ is the stable measurement inaccuracy;

$bias_{matx}$ is the inaccuracy due to matrix effects;

$S_{meas}$ is the stable measurement imprecision;

$n_{samp}$ is the number of replicate samples analyzed and averaged to provide a single test result;

z is the z value, usually set as 1.65 to specify that an analytical run will be rejected when the defect rate is a maximum of 5%; and f is the expected instability (or frequency of errors) which is used to indicate how often a given method has problems.

Using these input values, the computer is programmed to solve the analytical quality planning algorithm set forth below:

$$TE_{PT}=bias_{meas}+bias_{matx}+(\Delta SE_{cont}S_{meas})/\sqrt{n_{samp}}+(zs_{meas}\Delta RE_{cont})/\sqrt{n_{samp}}$$

where $TE_{PT}$ is the analytical quality requirement referred to above in connection with the CLIA standards. The analytical quality requirement is in the form of an allowable total error, which is generally represented by the abbreviation $TE_a$. In the United States, this term can be replaced with $TE_{PT}$ to represent the CLIA proficiency testing criteria for acceptable performance, which are analytical quality requirements of the total error form. Other terms in the analytical planning algorithm, not previously defined, include:

$\Delta SE_{cont}$ is the change in systematic error (unstable inaccuracy) detectable by the QC procedure; and $\Delta RE_{cont}$ is the change in random error (unstable imprecision) detectable by the QC procedure.

In preferred embodiments of the present invention, default values and simplifying assumptions are established to facilitate application of the algorithm. For general application, particularly with automated or mechanized analyzers, the quality planning algorithm may be simplified by combining the two bias terms to specify only a total bias, $Bias_{tot}$, and b) setting $\Delta RE_{cont}$ to 1.0 to optimize for systematic error rather than random error. The size of the systematic error that must be detected to maintain quality within the specified requirement can be determined by solving for $\Delta SE_{cont}$, then letting $\Delta SE_{cont}=\Delta SE_{crit}$ to denote this critically sized error.

RE optimization can be solved optionally. In the preferred embodiment of the software, this requires activation through File and Preferences, $\Delta SE_{cont}$ is set to 0.0 to simplify the model and only the effect of unstable RE is considered.

Thus, the simplifications of the analytical quality planning algorithm discussed above are used to calculate the critical sizes of systematic and random errors that need to be detected so the quality requirement will not be exceeded. Under these conditions, the term $\Delta SE_{crit}$ replaces $\Delta SE_{cont}$ and $\Delta RE_{crit}$ replaces $\Delta RE_{cont}$.

The critical systematic error, $\Delta SE_{crit}$, is calculated as follows:

$$\Delta SE_{crit}=[TE_{PT}-|bias_{meas}+bias_{matx}|)(\sqrt{n_{samp}}/s_{meas})]-z$$

The critical random error, $\Delta RE_{crit}$, is calculated as follows:

$$\Delta RE_{crit}=TE_{PT}-|bias_{meas}+bias_{matx}|)(\sqrt{n_{samp}}/zs_{meas})$$

Given an appropriate control rule, and the information calculated above from the analytical quality planning algorithm or algorithms derived from same, data can be displayed graphically in a manner which facilitates optimization of a quality control procedure.

A control rule is a decision criterion for interpreting control data and making a judgment on control status (in control or out-of-control)(see e.g., Westgard et al., *Clin. Chem.* 23: 1857 (1977)). The theoretical operating characteristics of control rules and numbers of control measurements are described by power curves or probabilities for rejecting runs having different amounts of error present (see e.g., Wegtgard, J. O. and Groth, T, *Clin. Chem.* 25: 394 (1979)). These power curves can be calculated based on probability theory or, alternatively, determined by computer simulation studies (see e.g., Westgard and Groth, *Clin. Chem.* 27: 1536 (1981)).

For example, the following control rules may be employed with individual-value charts where statistical control limits are drawn at certain multiples of the standard deviation(s) and measurements are plotted directly on the chart to assess control status:

$1_{3s}$ indicates a run is rejected if 1 control value in the group of N control measurements exceeds control limits set as the mean + or −3s, where the mean and standard deviation are determined for the control material being tested.

$2_{2s}$ indicates a run is rejected if 2 consecutive control values exceed the same control limit, which is either the mean+2s or the mean−2s.

$R_{4s}$ is a range rule where a run is rejected if one control value exceeds the mean+2s and another exceeds the mean−2s.

$4_{1s}$ indicates a run rejection if 4 consecutive control values exceed the mean+1s or the mean−1s.

$10_x$ refers to a criterion where a run is rejected if 10 consecutive control values fall on one side of the mean.

Other control rules establish control limits having a specified probability for false rejection ($P_{fr}$) The actual control limits are determined by looking up factors in a table, then multiplying the standard deviation by those factors. Some examples are the following:

$X_{0.01}$ refers to a control chart where individual values in a group of N control measurements are plotted directly and compared to control limits set such that the probability for false rejection is 0.01, i.e., there is only a 1% chance that a good run will be falsely rejected.

$X_{0.01}$ refers to a mean chart where the mean of a group of N control measurements is plotted and compared to control limits set such that the probability for false rejection is 0.01.

$R_{0.01}$ refers to a range chart where the difference between the high and low observations in a group of N control measurements is compared to a control limit set such that the probability for false rejection is 0.01.

Combinations of rules are indicated by individual rule abbreviations connected by a slash character, for example, $1_{3s}/2_{2s}$ indicates a multi-rule QC procedure that is made up of $1_{3s}$ and $2_{2s}$ control rules, and $X_{0.01}/R_{0.01}$ indicates a QC procedure using both mean and range control charts.

For most control rules in common use in clinical laboratories, the control limits are set as the mean plus and minus constant multiples of the observed standard deviation, regardless of the number of control measurements being collected (N). However, for mean and range rules and single-value variable-limit rules, the control limits change as N changes. The actual control limits are calculated by multiplying the standard deviation by the factor given in the table below.

Factors for calculating control limits

| Rule | Number of control measurements (N) | | | | |
|---|---|---|---|---|---|
| $1_{0.05}$ | 2.24 | 2.39 | 2.50 | 2.64 | 2.74 |
| $1_{0.01}$ | 2.81 | 2.93 | 3.01 | 3.13 | 3.21 |
| $1_{0.002}$ | 3.27 | 3.36 | 3.44 | 3.52 | 3.59 |
| $X_{0.05}$ | 1.39 | 1.13 | 0.98 | 0.80 | 0.60 |
| $X_{0.01}$ | 1.82 | 1.49 | 1.29 | 1.05 | 0.91 |
| $X_{0.002}$ | 2.19 | 1.78 | 1.54 | 1.26 | 1.09 |
| $R_{0.05}$ | 2.77 | 3.31 | 3.63 | 4.03 | 4.29 |
| $R_{0.01}$ | 3.64 | 3.63 | 4.40 | 4.76 | 4.99 |
| $R_{0.002}$ | 4.37 | 4.80 | 5.05 | 5.37 | 5.58 |

In the computer-implemented method of the present invention, a database of operating characteristics is provided for a wide variety of control rules and classes of control rules, including single-rule fixed limit, single-rule variable limit, multirule, and mean and range. In addition, an editor function allows the user to incorporate the operating characteristics of additional control rules and numbers of control measurements by entry of the probabilities of rejection for specified increases in systematic (for $\Delta SE_{cont}$ values of 0.0, 0.5s, 1.0s, 1.5s, 2.0s, 3.0s, 4.0s; $\Delta RE_{cont}$ values of 1.0, 1.5, 2.0, 3.0, 4.0), as determined from probability theory or by computer simulation studies.

These operating characteristics may be represented graphically using a variety of visual tools which are known in the art. These visual tools include, for example, power function graphs, critical error charts and operating specification charts (referred to herein as OPSpecs charts). Power function and critical error graphs plot the probability for rejection (P) on the y-axis and $\Delta SE$ (or $\Delta RE$ when optimizing for random error) on the x-axis. Critical error graphs display the size of the calculated medically important or critical systematic or random errors on the power curves. OPSpecs charts plot allowable inaccuracy ($bias_{tott}$) on the y-axis and allowable imprecision ($s_{meas}$) on the x-axis. For a more detailed discussion of OPSpecs charts see, for example, Westgard, *Arch Pathol. Lab. Med.* 116: 765 (1992); Westgard, *Clin. Chem.* 38: 1226 (1992); and Westgard, J. O., "Operating specifications for precision, accuracy, and quality control", *OPSpecs Manual—Expanded Edition*: Westgard Quality Control Corporation, Ogunquit ME, (1996).

Automatic QC (i.e., automatic control rule) selection is implemented on the basis of defined selection criteria and selection logic. In preferred embodiments, selection criteria employed to select candidate control rules from the database include 1) type of control rule; 2) total number of control measurements per run; 3) probability of false rejections (also expressed in percent as a false rejection rate); and 4) probability of error detection (also expressed in percent as error detection rate, or as percent analytical quality assurance (AQA)). Those skilled in the art are familiar with all of these parameters, and their significance with respect to control rule selection.

In preferred embodiments, default settings are provided. These default settings are shown in the selection criteria window of FIG. 3. Users are, of course, free to change the default settings to define the types of control rules to be implemented (e.g., single rule fixed limits, single rule variable limits, multi-rule, mean/range rules), the total number of control measurements of interest (N's of 1, 2, 3, 4, 6 and/or 8), the maximum false rejection (10%, 5% or 1%), and the desired error detection rate (90%, 50%, 25%) (%AQA) for high, moderate and low instability. For example, with default settings, the program first attempts to select QC procedures having at least 90% error detection, regardless of the expected frequency of errors, but will select QC procedures having at least 50% error detection if an expected instability of less than 2% has been entered. By changing the default settings, a user can enable the program to select QC procedures having at least 25% error detection for an expected instability of less than 2%.

Figure 3:
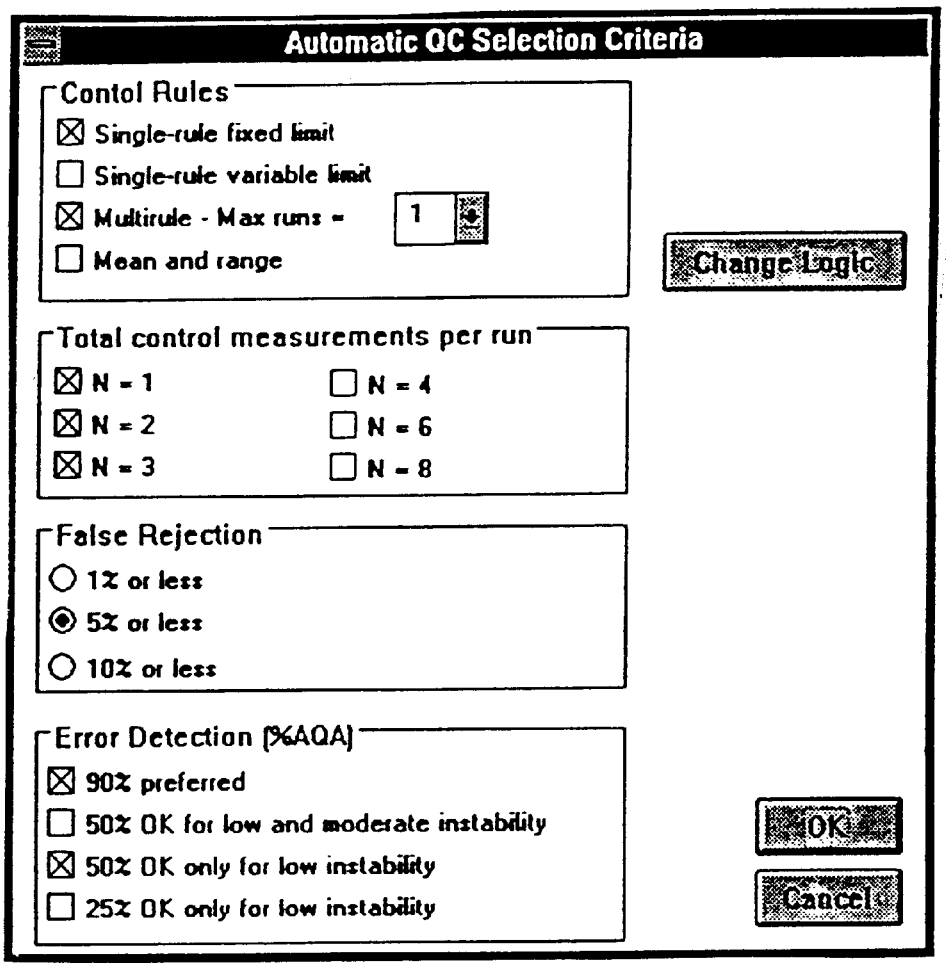
FIG. 3 represents a quality control procedure selection criteria window.

One of skill in the art will recognize that the options provided in the selection criteria window of FIG. 3 are somewhat arbitrary. For example, the desired error detection percentages, and minimum false rejection percentages provided could be percentages other than those provided.

Figure 4:
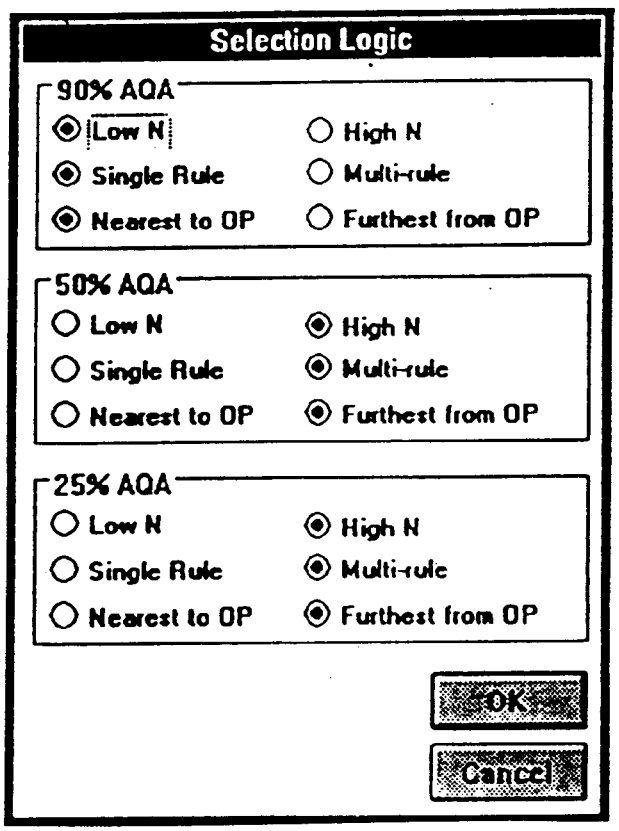
FIG. 4 represents a quality control procedure selection logic window.

Selection logic refers to the preferences, definable by the user, which determine the priority applied by the computer software in implementing the selection criteria discussed above. Default settings are again provided, as shown in FIG. 4. Users can modify default settings to define preference for low N vs. high N, single rule vs. multi-rule, and lower cost vs. higher error detection. For example, when 90% error detection can be achieved, default settings set preferences for the lowest N, single rule procedures which are the least expensive options. However, if 90% error detection can not be achieved, the default settings for 50% error detection provide preferences for the highest N multi-rule procedures having the highest error detection. As was stated in connection with selection criteria, the options provided in the selection logic window shown in FIG. 4 are merely examples. Those skilled in the art could design alternatives without the application of inventive skill.

Given required inputs for QC selection criteria and selection logic, the computer searches the control rule library for control rules and Ns satisfying selection criteria. The limits of allowable imprecision and inaccuracy for an OPSpecs chart are then derived for the candidate control rules and compared to the observed $bias_{tott}$ and $S_{meas}$ of the method (defined as the operating point). The 90% AQA charts are first checked to identify control rules and N whose operating limits are above the operating point. Each of these rules correspond to an appropriate QC procedure.

The computer is further programmed for control rule optimization. Control rule optimization means selecting: 1) an appropriate control rule from the database which has a high probability of detecting a systematic or random error in the patient samples results; 2) a low probability of false rejection (i.e., having to falsely retest the entire patient sample run due to a statistical performance characteristic of the control rule); and 3) a minimum number of controls in the run of patient samples.

If none of the control rules provides a solution at 90% AQA, the computer is programmed to check 50% AQA charts. If control rule solutions are identified, optimization is carried out as described above. If no solutions are identified at 50% AQA, 25% AQA charts are checked. If solutions are identified, control rule optimization is carried out. If no solutions are identified, the analyst is required to make a manual selection.

When the computer completes optimization by the selection of a control rule and N, the analyst must review this selection and initiate documentation, or override this selection by making a manual selection of a different rule and N. This option for review and manual selection could be eliminated, but is considered desirable in order to maintain the professional interest and responsibility of laboratory scientists. This selection completes the automatic QC selection process and provides the user with the information to prepare a control chart that can be used to plot control measurements from routine analytical runs. The control rule selected dictates whether the patient sample measurements are judged to be in a state of control, or not.

Given the subject disclosure, it would be a matter of routine skill to select an appropriate computer system and implement the claimed process on that computer system. This statement applies to all embodiments of the present invention, including the dynamic, real-time application discussed below.

ii. Clinical Quality Control

As stated previously, QC requirements can be defined in either clinical or analytical formats. Having discussed the analytical format, the clinical format will now be addressed. The logic for the clinical embodiments of the subject computer-implemented methods (as well as the analytical embodiments), are shown in FIG. 1. Clinical quality can be described as a medically important change in a test result that would affect the clinical interpretation of the test. The term decision interval ($D_{Int}$) is used to represent the size of the change between two different test results that would cause different actions or outcomes in the medical application of the test result (Westgard et al., *Clin. Chem.* 37: 656 (1991)).

The clinical quality-planning model that is incorporated in preferred embodiments of the present invention provides an approach which considers the potential variation of a test result due to biologic, pre-analytic, analytic, and quality control factors—all of which may contribute to the uncertainty of a single test result. The use of clinical quality requirements can be expected to be difficult because of the difficulty in finding the necessary information for all the terms included in the model.

The most readily available recommendations are those provided by Skendzel et al. (*Am. J. Clin. Pathol.*83: 200 (1985)). It is noted that information concerning decision intervals is found in Table 1 of Skedzel et al., not in the table relating to medically allowable standard deviations, whose calculations do no not take into account the within-subject biological variation.

Quality planning algorithms describe the mathematical relationship between the quality of a test result and the factors that can cause variation in that result. Some of the factors which must be considered are analytical. These include, for example, the imprecision and inaccuracy of the measurement procedure and the sensitivity (or error detection capability) of the QC procedure. Others are pre-analytical, such as the within-subject biological variation that describes the changes in concentration due to normal biological variation. The clinical quality planning algorithm employed in preferred embodiments of the present invention is shown below.

$$D_{Int} = bias_{spec} + bias_{meas} + bias_{matx} +$$

$$\Delta SE_{cont}S_{meas} / \sqrt{n_{samp}} + z \sqrt{\frac{s^2_{wsub}}{n_{test}} + \frac{s^2_{spec}}{n_{test}n_{spec}} + \frac{(\Delta RE_{cont}S_{meas})^2}{n_{test}n_{spec}n_{samp}}}$$

The clinical quality planning algorithm contains additional parameters, as compared with the analytical quality planning algorithm. Generally, these additional parameters relate to pre-analytical components of test variation. The clinical quality planning algorithm variables are defined as follows:

$bias_{spec}$ represents sampling or specimen bias which allows for a pre-analytical component of systematic error which is entered as a percentage;

$bias_{matx}$ is the inaccuracy due to matrix effects;

$s_{wsub}$ represents the within-subject biological variation which is the standard deviation that represents the average biological variation of an individual subject which is entered as a percentage;

$s_{spec}$ is the between specimen sampling variation which allows for the random variation between specimens, which is entered as a percentage;

$n_{test}$ is the number of tests drawn at separate times which are averaged to obtain a test result that will be interpreted;

$n_{spec}$ is the number of specimens which are drawn and averaged for each test;

$n_{samp}$ is the number of samples or replicates measured for each specimen (see page 8); and z-value defines the maximum defect rate that is allowed before the testing process is declared out-of-control (the default value is set at 1.65 which defines a maximum defect rate of 5%).

Equations for the calculation of the critical systematic and random errors are derived in the same manner as was described for the analytical model. The equations will, of course, appear to be considerably more complex due to the inclusion of the additional terms defined above. Of the pre-analytical terms, it is most critical to account for within-subject biological variation (see e.g., Fraser, C. G., *Arch. Pathol. Lab. Med.*: 916 (1992)). Estimates of other terms may also be found in the literature (see e.g., Young, *Effects of Preanalytical Variables on Clinical Laboratory Tests*, AACC Press, Washington, DC (1993)).

Automatic QC selection in the clinical embodiment of the present invention is a process which is identical to that described above in connection with the analytical embodiment, but for the differences between the clinical and analytical algorithms.

iii. Dynamic, Real-Time Application of Automatic QC Selection

Figure 2:
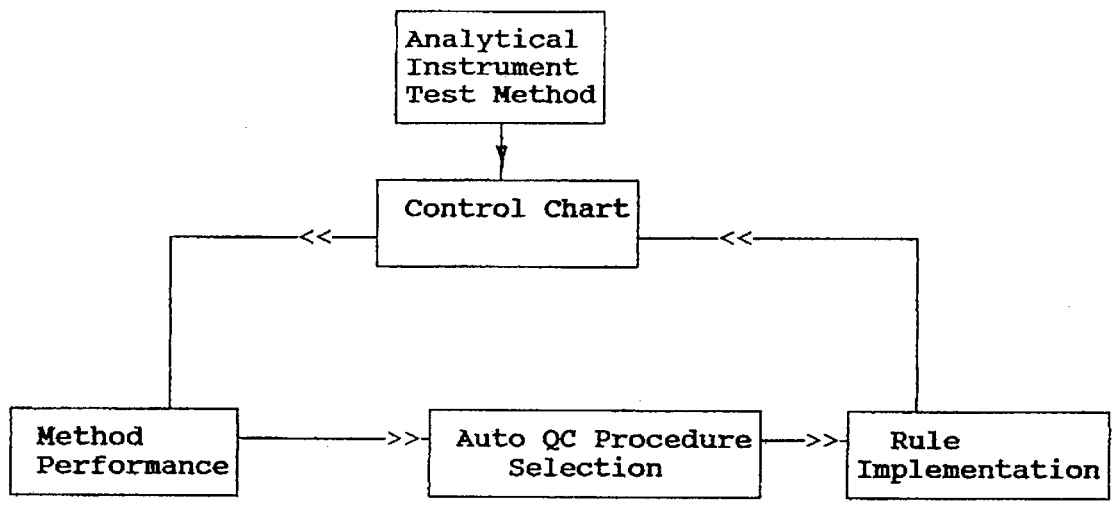
FIG. 2 represents a logic diagram for the dynamic, real-time application of automatic quality control procedure selection.

Automatic QC selection in the context of both analytical and clinical quality planning has been discussed above. FIG. 2 shows the logic for a dynamic, real-time application of automatic QC selection which can be applied in either a clinical or analytical context. The initial steps in this application are identical to those discussed previously in sections i) and ii), above.

For example, with respect to an analytical application of the dynamic embodiment of the present invention, initial inputs of a quality requirement and observed performance characteristics of a method are provided. A quality control procedure (comprising a control-rule and an N) is then selected automatically as previously described. As shown in FIG. 2, quality control data, generated by an analytical instrument, are transferred to a software program, either embedded within the medical device micro processor, or to a laboratory information system (LIS), or data management system (DMS), or a stand alone PC program resident on a PC hard disk. The integration of these various components is a matter of routine skill. The control data is then converted to a control chart format in real time. The control data is then analyzed on a continuing basis, and analytical statistical method of performance results are calculated. Numerical values for the method performance are input into a computer programmed to carry out the automatic QC procedure selection described above. In this way, an appropriate QC procedure is automatically selected. The QC procedure which has been automatically selected is used to evaluate the control data for purposes of accepting or rejecting the patient samples in a run.

The introduction of a feedback loop for real time QC data enables an analytical measurement system, for example, to automatically select a higher N value, or a more sensitive control rule if method performance deteriorates. Alternatively, N would be automatically decreased or a less sensitive control rule would be automatically selected if method performance were to improve.

We claim:

1. A computer implemented method for automating the selection of an analytical statistical quality control (QC) procedure, the method comprising:

a) providing inputs of a quality requirement and observed performance characteristics of a method of measurement;

b) providing a database of theoretical operating characteristics of statistical QC procedures;

c) providing an analytical quality-planning algorithm which relates the quality requirement, the observed performance characteristics of the method of measurement, and the theoretical operating characteristics of statistical QC procedures;

d) providing QC selection criteria and selection logic;

e) automatically choosing, based on the quality requirement, observed method performance, and operating characteristic of candidate QC procedures, a subset of control rules and numbers of control measurements which satisfy selection criteria and selection logic.

2. The method of claim 1 wherein the statistical QC procedure can be characterized by a control rule, control statistic, or control chart whose operating characteristics can be described in terms of probabilities of acceptance or rejection as a function of the size of systematic and random errors.

3. The method of claim 2 wherein the control statistic represents the average of normal patient test results used to monitor errors or changes.

4. The method of claim 1 wherein the quality specification is an analytical quality requirement for the allowable total error, TEa.

5. The method of claim 1 wherein the input parameters necessary for the analytical quality-planning algorithm are the stable imprecision observed ($S_{meas}$); stable inaccuracy ($bias_{meas}$); matrix inaccuracy ($bias_{matx}$); number of replicate samples ($n_{samp}$); and z-value for maximum defect rate (z).

6. The method of claim 1 further comprising automatically selecting from among the subset of control rules in step e) the control rule which best satisfies the selection criteria and selection logic for type of control rule or control chart, total numbers of control measurements per analytical run, error detection rate, and false rejection rate.

7. The method of claim 6 wherein the database of operating characteristics of statistical QC procedures comprises types of control rules and control charts selected from the group consisting of single-rule constant limits, single-rule variable limits, multi-rule with specified maximum number of runs, and mean/range rules.

8. The method of claim 6 wherein the selection criteria and selection logic for the total number of control measurements per analytical run (N) includes 1, 2, 3, 4, 6, and 8 control measurements per run.

9. The method of claim 6 wherein the selection criteria and selection logic for the rate of error detection are 90% or more, 50% or more, or 25% or more.

10. The method of claim 9 wherein the selection criteria and selection logic for error detection depend on the input for the observed instability of the measurement procedure.

11. The method of claim 6 wherein the selection criteria and selection logic for the rate of false rejection are 10% or less, 5% or less, or 1% or less.

12. A computer implemented method for automating the selection of a clinical statistical quality control (QC) procedure, the method comprising:

a) providing inputs of a quality requirement and observed performance characteristics of a method of measurement;

b) providing a database of theoretical operating characteristics of statistical QC procedures;

c) providing a clinical quality-planning algorithm which relates the quality requirement, the observed performance characteristics of the method of measurement, and the theoretical operating characteristics of statistical QC procedures;

d) providing QC selection criteria and selection logic;

e) automatically choosing, based on the quality requirement, observed method performance, and operating characteristic of candidate QC procedures, a subset of control rules and numbers of control measurements which satisfy selection criteria and selection logic.

13. The method of claim 12 wherein the statistical QC procedure can be characterized by a control rule, control statistic, or control chart whose operating characteristics can be described in terms of probabilities of acceptance or rejection as a function of the size of systematic and random errors.

14. The method of claim 13 wherein the control statistic represents the average of normal patient test results used to monitor errors or changes.

15. The method of claim 12 wherein the quality specification is a clinical quality requirement for a medically important change in the form of a decision interval, DInt.

16. The method of claim 12 wherein the input parameters necessary for the clinical quality-planning algorithm are the stable imprecision observed ($S_{meas}$); stable inaccuracy ($bias_{meas}$); matrix inaccuracy ($bias_{matx}$); specimen bias ($bias_{spec}$); within-subject biological variation ($S_{wsub}$); sampling variation ($S_{spec}$); number of tests ($n_{test}$); number of specimens ($n_{spec}$); number of replicate samples ($n_{samp}$); and z-value for maximum defect rate (z).

17. The method of claim 12 further comprising automatically selecting from among the subset of control rules in step e) the control rule which best satisfies the selection criteria and selection logic for type of control rule or control chart, total number of control measurements per analytical run, error detection rate, and false rejection rate.

18. The method of claim 17 wherein the database of operating characteristics of statistical QC procedures comprises types of control rules and control charts selected from the group consisting of single-rule constant limits, single-rule variable limits, multi-rule with specified maximum number of runs, and mean/range rules.

19. The method of claim 17 wherein the selection criteria and selection logic for the total number of control measurements per analytical run (N) includes 1, 2, 3, 4, 6, and 8 control measurements per run.

20. The method of claim 19 wherein the selection criteria and selection logic for the rate of error detection are 90% or more, 50% or more, or 25% or more.

21. The method of claim 20 wherein the selection criteria and selection logic for error detection depends on the input for the observed instability of the measurement procedure.

22. The method of claim 16 wherein the selection criteria for the rate of false rejection are 10% or less, 5% or less, or 1% or less.

23. A dynamic QC process for automatically changing the statistical QC procedure when there are changes in performance of the method of measurement, the method comprising:
   a) providing inputs of a quality requirement and initial observed performance characteristics of a method of measurement;
   b) providing a database of theoretical operating characteristics of statistical QC procedures;
   c) providing quality-planning algorithms which relate the quality requirement, the observed performance characteristics of the method of measurement, and the theoretical operating characteristics of statistical QC procedures;
   d) providing QC selection criteria and selection logic;
   e) automatically choosing, based on the quality requirement, observed method performance, and operating characteristic of candidate QC procedures, a subset of control rules and numbers of control measurements which satisfy selection criteria and selection logic;
   f) providing real time statistical estimates of method performance characteristics through on-line sampling with an analytical instrument;
   g) repeating steps b)-f) above for a sequence of runs thereby automatically selecting a higher number of control measurements or more sensitive control rules when method performance deteriorates and decreasing the number of control measurements or changing to less sensitive control rules when method performance improves;
   h) implementing the selected statistical QC procedure through calculations and control charts;
   i) providing an assessment of the state of control and a decision about the acceptance or rejection of individual analytical runs based on the selected statistical QC procedure.

* * * * *